United States Patent
He et al.

(10) Patent No.: US 8,901,251 B2
(45) Date of Patent: Dec. 2, 2014

(54) METHOD FOR MAKING ELECTRODE ACTIVE MATERIAL OF LITHIUM ION BATTERY

(71) Applicants: Xiang-Ming He, Beijing (CN); Li Wang, Beijing (CN); Jian-Jun Li, Beijing (CN); Jian Gao, Beijung (CN)

(72) Inventors: Xiang-Ming He, Beijing (CN); Li Wang, Beijing (CN); Jian-Jun Li, Beijing (CN); Jian Gao, Beijung (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 164 days.

(21) Appl. No.: 13/668,480

(22) Filed: Nov. 5, 2012

(65) Prior Publication Data

US 2014/0008233 A1 Jan. 9, 2014

(30) Foreign Application Priority Data

Jul. 6, 2012 (CN) .......................... 2012 1 0233406

(51) Int. Cl.
 *C08F 8/34* (2006.01)
 *C08F 8/48* (2006.01)
 *C08F 20/44* (2006.01)
 *C08F 120/44* (2006.01)
 *H01M 4/1399* (2010.01)

(52) U.S. Cl.
 USPC .................. 525/329.1; 525/329.2; 525/329.3; 525/354; 525/343; 525/337; 525/376; 429/213

(58) Field of Classification Search
 CPC .............. C08F 8/34; C08F 8/48; C08F 20/44; C08F 120/44; C08F 6/06; H01M 4/602; H01M 4/604; H01M 4/608; H01M 4/1399; H01M 4/137; H01M 4/606
 USPC ................ 525/329.1, 329.2, 329.3, 343, 354; 429/213
 See application file for complete search history.

(56) References Cited

U.S. PATENT DOCUMENTS

2011/0200875 A1* 8/2011 Miyuki et al. ................ 429/213
2012/0059128 A1 3/2012 He et al.
2013/0029222 A1* 1/2013 Niwa et al. ................... 429/211

FOREIGN PATENT DOCUMENTS

TW 201213366 4/2012

OTHER PUBLICATIONS

Fanous et al., Chem. Mater. 23 (2011) 5024-5028.*
Ren et al., Fabrication of Li ion battery with sulfurized polyacrylonitrile, Fabrication of Li ion battery with sulfurized polyacrylonitrile, Battery Bimonthly, 2008, vol. 38, No. 2, p. 73-74.

* cited by examiner

*Primary Examiner* — Roberto Rabago
(74) *Attorney, Agent, or Firm* — Novak Druce Connolly Bove + Quigg LLP

(57) ABSTRACT

A method for making an electrode active material of a lithium ion battery is disclosed. In the method, elemental sulfur is mixed with a polyacrylonitrile to form a mixture. The mixture is heated in vacuum or a protective gas at a heating temperature of about 250° C. to about 500° C., to form a sulfur containing composite. The sulfur containing composite is reacted with a reducing agent for elemental sulfur in a liquid phase medium to remove part of the elemental sulfur from the sulfur containing composite.

15 Claims, 3 Drawing Sheets

METHOD FOR MAKING ELECTRODE ACTIVE MATERIAL OF LITHIUM ION BATTERY

CROSS-REFERENCE TO RELATED APPLICATIONS

This application claims all benefits accruing under 35 U.S.C. §119 from China Patent Application No. 201210233406.5, filed on Jul. 6, 2012, in the China Intellectual Property Office, the disclosure of which is incorporated herein by reference.

BACKGROUND

1. Technical Field

The present disclosure relates to methods for making electrode active materials of lithium ion batteries.

2. Description of Related Art

Polyacrylonitrile (PAN) is a high polymer composed of saturated carbon skeleton containing cyano groups on alternate carbon atoms. PAN itself is not conductive but can be sulfurized to form sulfurized polyacrylonitrile which is conductive and chemically active. Specifically, the PAN powder and sulfur powder are mixed to form a mixture. The mixture is then heated, thereby forming sulfurized polyacrylonitrile. The sulfurized polyacrylonitrile can be used as a cathode active material of a lithium ion battery and has a high discharge capacity at a first cycle.

However, as the cycling of the lithium ion battery goes on, the discharge capacity of the lithium ion battery decreases dramatically, which induces a relatively low capacity retention of the lithium ion battery. As reported, the discharge capacity of the lithium ion battery decreases from 906.4 mAh at the first cycle to 740.0 mAh at the $20^{th}$ cycle. The capacity retention of the lithium ion battery after 20 cycles is only about 81.7%.

What is needed, therefore, is to provide a method for making an electrode active material of a lithium ion battery, which has a relatively high specific capacity and capacity retention.

BRIEF DESCRIPTION OF THE DRAWINGS

Many aspects of the present disclosure can be better understood with reference to the following drawings. The components in the drawings are not necessarily to scale, the emphasis instead being placed upon clearly illustrating the principles of the present embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean at least one.

Figure 1:
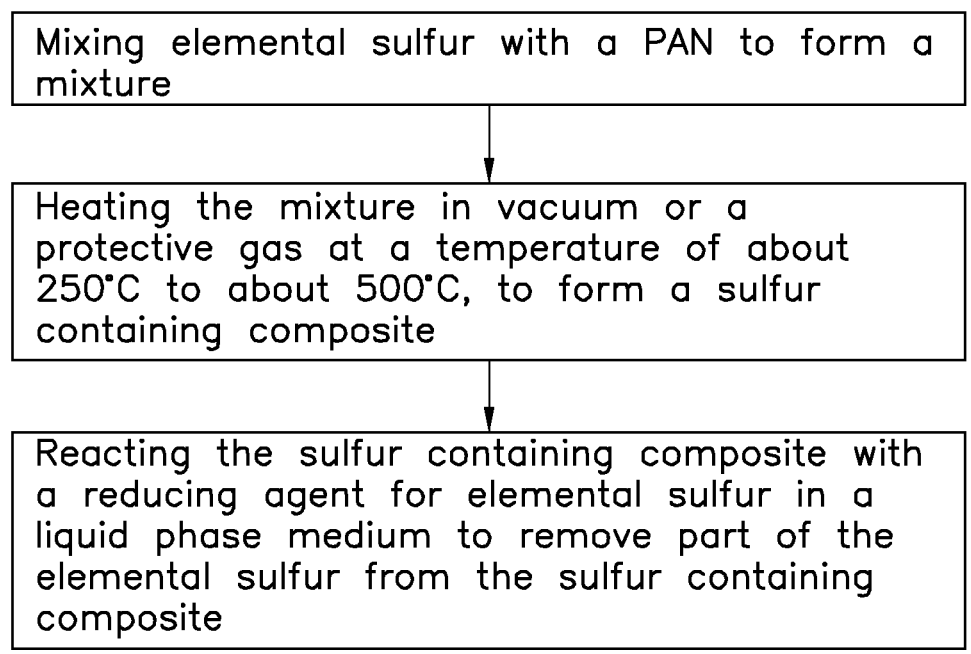
FIG. 1 is a flowchart of an embodiment of a method for making an electrode active material of a lithium ion battery.

Referring to FIG. 1, one embodiment of a method for making an electrode active material of a lithium ion battery includes steps of:

S1, mixing an elemental sulfur with a PAN to form a mixture;

S2, heating the mixture in vacuum or a protective gas at a temperature of about 250° C. to about 500° C., to form a sulfur containing composite; and S3, reacting the sulfur containing composite with a reducing agent for elemental sulfur in a liquid phase medium to remove part of the sulfur from the sulfur containing composite.

In the step S1, the elemental sulfur and the PAN can both have a shape of powder or particles. The powder or particles of the elemental sulfur and the PAN can be uniformly mixed by mechanically stirring at solid state. The molecular weight of the PAN is not limited, and can be in a range from 1000 to 100000. The amounts of the elemental sulfur and the PAN are not limited. In one embodiment, a mass ratio of the elemental sulfur and the PAN can be in a range from about 1:2 to about 10:1.

In the step S2, the solid elemental sulfur is heated to the gas state and uniformly contacts with the surface of the PAN. At the same time, the PAN has a pyrolysis and a cyclizing process during the heating to form a poly(pyridinopyridine) (PPY) matrix. The sulfur that is in contact with the PAN is reacted with or combined with the cyclized PAN, and thus uniformly distributed in the PPY matrix.

A material of the PPY matrix includes a chemical group of formula (1):

wherein n is an integer larger than 1.

In the sulfur containing composite, a majority of the sulfur in relatively small size is the "poly-sulfur group" covalently bonded with the PPY matrix. The other part of the sulfur is elemental sulfur grains uniformly distributed in and composited with the PPY matrix. The elemental sulfur grains have relatively large size and weight (e.g., larger than a molecular weight of $S_8$). The elemental sulfur grains are combined with the PPY matrix by a weak intermolecular force, such as van der Waals attractive force between the elemental sulfur grains and the PPY matrix. The protective gas can be an inert gas or a nitrogen gas.

Further, the step S2 can be processed in a sealed container filled with the protective gas. In the sealed container, the elemental sulfur will not leak out during the heating. Further, due to the gasification of the elemental sulfur, the gas pressure in the sealed container can be larger than 1 atmospheric pressure. Therefore, the sealed container can promote a uniform dispersion of sulfur in the product. In one embodiment, the heating temperature is about 320° C. to about 400° C. At the temperature of about 320° C. to about 400° C., the PAN can be fully cyclized to form a plurality of pyridinopyridine groups joined together, such that the n of formula (1) can be equal to or larger than 10. In one embodiment, the heating temperature is about 350° C. The heating time can be determined by the amount of the mixture, and can be in a range from about 1 hour to about 10 hours.

In one embodiment, the mixture is heated in a sealed autoclave at a temperature of 350° C. for about 2 hours, and the weight percentage of the sulfur in the product of step S2 is about 47%.

In the step S3, the reducing agent has a relatively strong reducibility and can have a reducing reaction with elemental sulfur, to reduce the elemental sulfur to a lower valence (e.g., −2) of sulfur. For example, the elemental sulfur can be reduced to form the hydrogen sulfide ($H_2S$) or soluble sulfide, such as sodium sulfide ($Na_2S$), potassium sulfide ($K_2S$), and lithium sulfide ($Li_2S$). The reducing agent can be potassium borohydride ($KBH_4$) or hydrazine ($N_2H_4$).

The liquid phase medium can dissolve the reducing agent. The liquid phase medium can be water or ethanol. The sulfur containing composite is in solid state in the liquid phase medium and does not dissolve therein. The sulfur containing composite does not have a chemical reaction with the liquid phase medium. Thus, a liquid-solid mixture of the reducing agent and the sulfur containing composite can be formed in the liquid phase medium.

In the sulfur containing composite, there may be two forms of the sulfur, one is the "poly-sulfur group" covalently bonded with the PPY matrix, the other is the elemental sulfur grains. The elemental sulfur grains in relatively large sizes can be removed from the sulfur containing composite by having the reducing reaction. The sulfur containing composite can thus be formed into a sulfur grafted poly(pyridinopyridine) (SPPY) having the "poly-sulfur groups" covalently bonded with the PPY matrix.

The sulfur can exist as a "poly-sulfur group" consisting of one or more sulfur elements, which can be represented by a formula of $S_x$, wherein x is an integer between 1 and 8. In one embodiment, $2 \leq x \leq 7$ (e.g., x=4). When the "poly-sulfur group" includes more than one sulfur element, the sulfur elements can be connected to each other as a chain. For example, if x=4, a formula of the "poly-sulfur group" is —S—S—S—S—, and if x=8, a formula of the "poly-sulfur group" is —S—S—S—S—S—S—S—S—, wherein "—" represents a covalent bond. The SPPY can include a plurality of the poly-sulfur groups dispersed in the PPY matrix and combined with the PPY matrix with the covalent bonds.

In one embodiment, the $S_x$ is doped in the chemical group of formula (1) and covalent bonded with a carbon element thereof. For example, the SPPY can include a chemical group of formula (2):

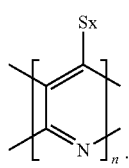

(2)

The molecular weight of the SPPY can be equal to or larger than 188.

Figure 2:
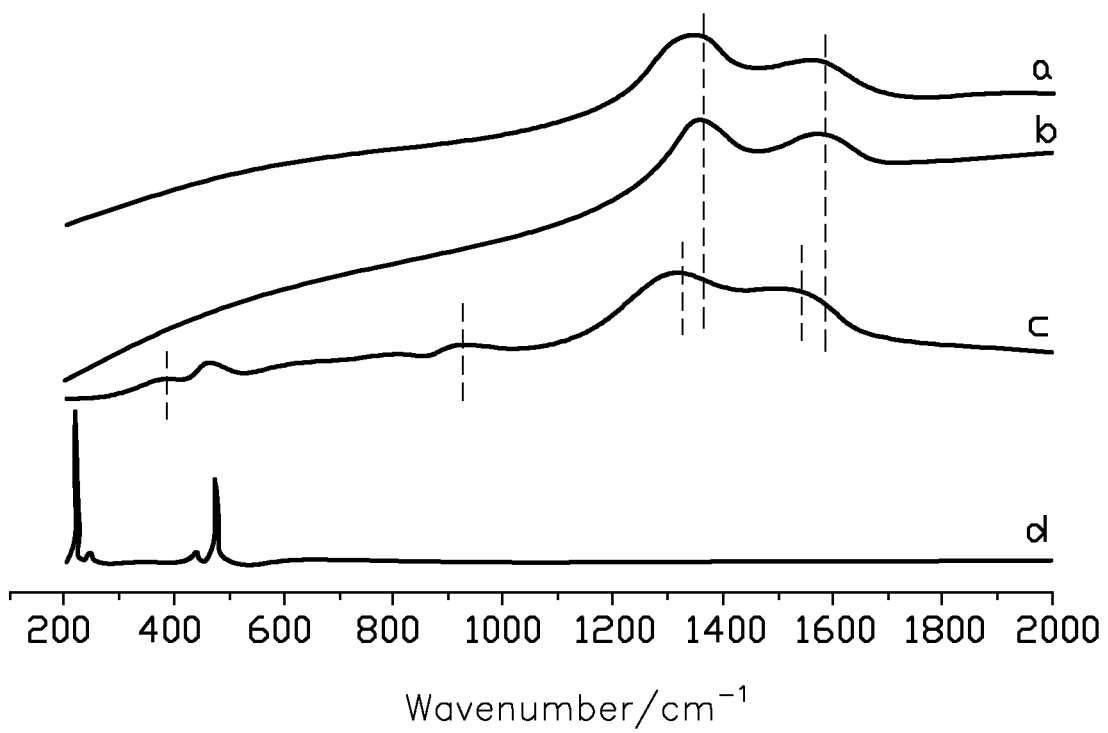
FIG. 2 shows a Raman spectra of (a) pyrolytic PAN in argon atmosphere, (b) pyrolytic PAN in air, (c) SPPY, and (d) elemental sulfur.

Referring to FIG. 2, the SPPY is compared with the elemental sulfur and the pyrolytic pure PAN in the Raman spectra. In FIG. 2, the curve a is the Raman spectra of the pyrolytic pure PAN formed by having pure PAN sintered in an Ar gas, the curve b is the Raman spectra of the pyrolytic pure PAN formed by having pure PAN sintered in air, the curve c is the Raman spectra of the final product having the heating step of S3 in vacuum, and the curve d is the Raman spectra of the elemental sulfur. FIG. 2 shows that the curves a and b both have main bands at 1582 $cm^{-1}$ and 1375 $cm^{-1}$, which are often referred to as the G mode and D mode, respectively. However, these bands (387 $cm^{-1}$ and 928 $cm^{-1}$) in the curve c (i.e., for SPPY) shift to a lower wavenumber, which indicates that the sulfur and the PPY matrix are bonded by C-S covalent bonds.

In the formula (2), the $S_x$ can be connected with two or more pyridinopyridine groups

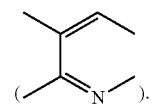

For example, the SPPY can include at least one chemical groups of formulas (3) to (5):

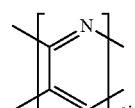

(3)

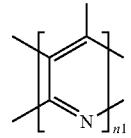

(4)

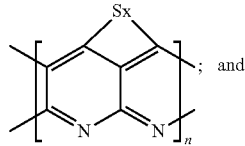

; and

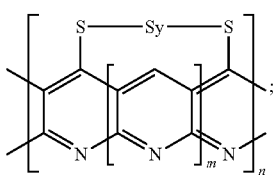

(5)

wherein n1 and n2 are both integers larger than 1, and n1 and n2 can be the same or different, Sy is also a "poly-sulfur group" including a sulfur chain, m and y are both an integer larger than 0. In one embodiment, $m \leq y \leq 6$.

In the step S3, the reducing agent and the sulfur containing composite are added into the liquid phase medium. The amount of the reducing agent can be excessive to completely remove the elemental sulfur grains. However, the "poly-sulfur groups" cannot be removed because of the covalent bond between the $S_x$ and the PPY matrix. After the step S3, the weight percentage of the sulfur element in the SPPY is equal to or less than 42%.

By removing the elemental sulfur grains, the capacity retention of the lithium ion battery using the SPPY as the electrode active material can be improved. Therefore, the step S3 is not a purification step to remove the elemental sulfur. This is because the elemental sulfur itself has the capacity during the cycling of the lithium ion battery (i.e., the elemental sulfur itself is a cathode active material).

The step S3 can include steps of:

S31, introducing the sulfur containing composite into a container having the liquid phase medium filled therein;

S32, uniformly dispersing the sulfur containing composite in the liquid phase medium through mechanical stirring or ultrasonic vibration;

S33, adding the reducing agent into the container while continuously mechanically stirring or ultrasonically vibrating the liquid phase medium, to dissolve the reducing agent in the liquid phase medium and react the reducing agent with the sulfur containing composite; and S34, separating the achieved SPPY from the liquid phase medium and purifying the achieved SPPY.

Further, in the step S33, the liquid phase medium can be heated to promote the chemical reaction between the reducing agent and the sulfur containing composite. The heating temperature in the step S33 can be in a range from about 90° C. to about 150° C.

In another embodiment, the step S3 can include steps of:

S31', introducing the sulfur containing composite with the reducing agent into a container having the liquid phase medium filled therein;

S32', mechanically stirring or ultrasonically vibrating the liquid phase medium to uniformly disperse the sulfur containing composite in the liquid phase medium while dissolving the reducing agent in the liquid phase medium and reacting the reducing agent with the sulfur containing composite; and S33', separating the achieved SPPY from the liquid phase medium and purifying the achieved SPPY.

Further, in the step S32', the liquid phase medium can be heated to promote the chemical reaction between the reducing agent and the sulfur containing composite. The heating temperature in the step S33 can be in a range from about 90° C. to about 150° C.

Further, after the steps S3, the method can further include a step S4 of electrochemically reducing the "poly-sulfur groups" of $S_x$ into elemental sulfur. The reducing voltage for the electrochemically reducing "poly-sulfur group" of $S_x$ can be about 1.7 V to about 1.75 V (vs. Li$^+$/Li). In one embodiment, the final product can be arranged in an electrochemical reactor (e.g., in an electrochemical battery) as an anode electrode, and then the battery is discharged at a voltage of about 1.7 V to about 1.75 V (vs. Li$^+$/Li). In one embodiment, the counter electrode is lithium metal, the battery is discharged using a constant current density of about 20 mA/g until the battery reaches a discharge cut-off voltage of about 0 V. The "poly-sulfur group" has one or more sulfur elements (smaller than 8), and the "poly-sulfur groups" are joined to the carbon atoms of the PPY matrix by covalent bonds. Thus, due to the electrochemically reducing step, the covalent bonds are broken, and a plurality of elemental sulfur particles, each of which is one sulfur molecule (e.g., a $S_8$ ring) or a sulfur atom cluster having 1 to 7 sulfur atoms can be formed. The plurality of elemental sulfur particles are uniformly dispersed in the PPY matrix. However, the electrochemically reducing step of step S4 is an irreversible reaction. The elemental sulfur particles cannot be joined to the carbon atoms of the PPY matrix again by covalent bonds through an electrochemically oxidizing step.

Figure 3:
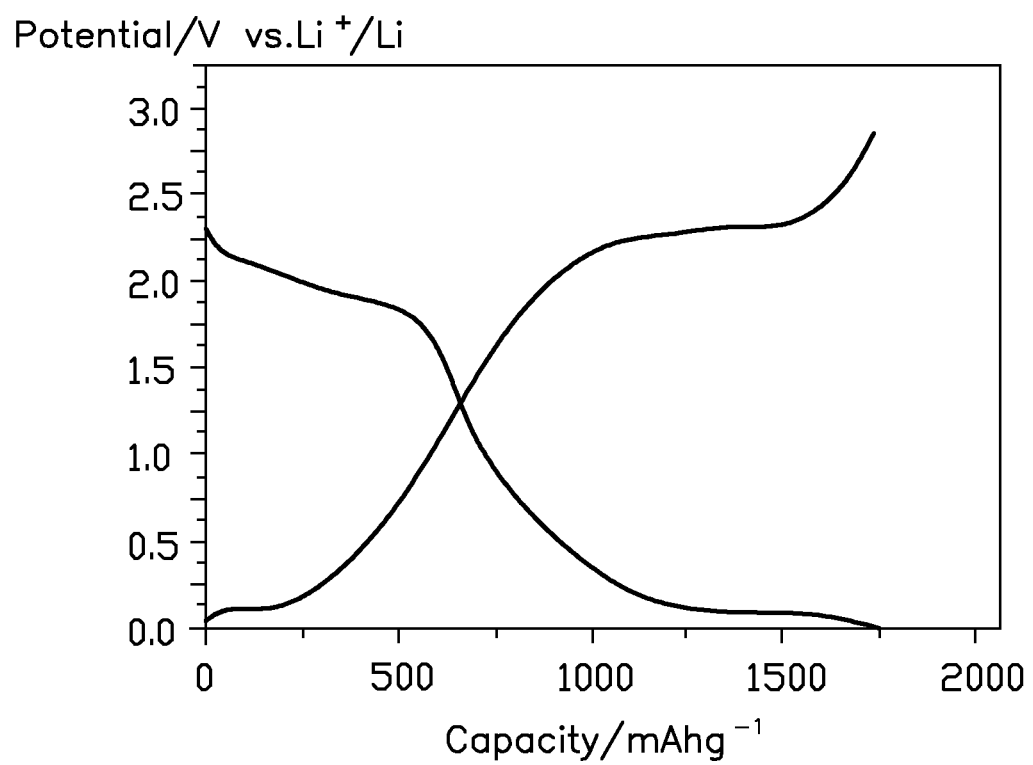
FIG. 3 shows discharge and charge curves of an embodiment of a lithium ion battery.

Referring to FIG. 3, a lithium ion battery using the SPPY as the anode active material and the lithium metal as the counter electrode is assembled. The lithium ion battery is cycled using a constant current in a galvanostatic charge/discharge measurement. As shown in the charge/discharge curves of the lithium ion battery in FIG. 3, the curves have plateaus between a voltage range of about 0.1 V to about 0.25 V. Therefore, the SPPY in the voltage range of about 0.1 V to about 0.25 V has a reversible charge/discharge capacity, and can be used as an anode active material of the lithium ion battery. More specifically, the SPPY has a discharge process at about 2 V and a charge process at about 2.25 V. Therefore, when the SPPY is used as the anode active material, the cathode active material can be selected from the cathode active materials having a relatively high discharge voltage (e.g., larger than or equal to about 4 V vs. Li$^+$/Li).

Additionally, the curve of the SPPY has a discharge plateau at a voltage of about 2 V and a charge plateau at a voltage of about 2.25 V. Therefore, the SPPY can also be used as a cathode active material of a lithium ion battery.

EXAMPLE

TABLE 1

| | Weight percentage of the sulfur in the cathode active material | First cycle discharge capacity (mAh/g) | 50$^{th}$ cycle discharge capacity (mAh/g) | Capacity retention after 50 cycles | 100$^{th}$ cycle discharge capacity (mAh/g) | Capacity retention after 100 cycles |
|---|---|---|---|---|---|---|
| Example 1 | 41% | 1753 | 1698 | 96.8% | 1632 | 93.1% |
| Example 2 | 41% | 1759 | 1703 | 96.8% | 1680 | 95.5% |
| Example 3 | 35% | 1637 | 1505 | 91.9% | 1489 | 91.0% |
| Example 4 | 37% | 1677 | 1530 | 91.4% | 1494 | 89.1% |
| Example 5 | 41% | 1747 | 1685 | 96.5% | 1623 | 92.9% |
| Comparative Example | 47% | 1788 | 1520 | 85.0% | 1321 | 73.9% |

Example 1

1.6 g of elemental sulfur powders is uniformly mixed with 1 g of PAN powders to form a mixture. The mixture is put into a sealed autoclave filled with the nitrogen gas and heated at a temperature of about 350° C. for about 2 hours. After that, the heating is stopped and the autoclave is cooled down to room temperature. The sulfur containing composite is achieved and then dispersed in 100 ml of water through an ultrasonic vibration. Then 0.7 g KBH$_4$ is dissolved into the water accompanying with a stirring of the water for about 2 hours. The KBH$_4$ is reacted with the sulfur containing composite in the water, and then the solid product SPPY is filtered out from the water, washed twice, and dried at about 60° C. A lithium ion battery is assembled using the SPPY as the cathode active material. The conducting agent is acetylene black. The binder is PVDF. The anode electrode is metal lithium. The electrolyte solution is 1 mol/L $LiPF_6$/EC+DEC (1:1,v:v). The lithium ion battery is cycled using a constant current in a galvanostatic charge/discharge measurement. As shown in table 1, all the coulombic efficiencies per cycle for 100 cycles are above 99%.

Example 2

The SPPY is prepared by using the same method as in Example 1. The SPPY is discharged at an anode of a primary battery from a voltage of about 1.75 V to about 0 V (vs. $Li^+$/Li). The counter electrode is metal lithium. The current density is about 20 mA/g. The SPPY then gets out from the anode of the primary battery and is assembled into a lithium ion battery as the cathode active material and cycled under the same conditions with Example 1. The test result is shown in Table 1.

Example 3

The SPPY is prepared by using the same method as in Example 1 except that the mixture of the elemental sulfur powders and the PAN powders is heated at an open environment under 1 atm. The lithium ion battery is assembled and cycled under the same conditions with Example 1. The test result is shown in Table 1.

Example 4

The SPPY is prepared by using the same method as in Example 1 except that the mixture of the elemental sulfur powders and the PAN powders is heated at a temperature of about 300° C. The lithium ion battery is assembled and cycled under the same conditions with Example 1. The test result is shown in Table 1.

Example 5

1.6 g of elemental sulfur powders is uniformly mixed with 1 g of PAN powders to form a mixture. The mixture is put into a sealed autoclave filled with the nitrogen gas and heated at a temperature of about 350° C. for about 2 hours. After that, the heating is stopped and the autoclave is cooled down to room temperature. The sulfur containing composite is achieved and then dispersed in 100 ml of water through ultrasonic vibration. Then 25 ml of $N_2H_4$ having a concentration of 0.5 mol/L is added into the water accompanying with a stirring of the water for about 2 hours. The $N_2H_4$ is reacted with the sulfur containing composite in the water, and then the solid product SPPY is filtered out from the water, washed twice, and dried at about 60° C. The lithium ion battery is assembled and cycled under the same conditions with Example 1. The test result is shown in Table 1.

Comparative Example 1.6 g of elemental sulfur powders is uniformly mixed with 1 g of PAN powders to form a mixture. The mixture is put into a sealed autoclave filled with the nitrogen gas and heated at a temperature of about 350° C. for about 2 hours. After that, the heating is stopped and the autoclave is cooled down to room temperature. The sulfur containing composite is used as the cathode active material. The lithium ion battery is assembled and cycled under the same conditions with Example 1. The test result is shown in Table 1.

Depending on the embodiment, certain steps of the methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

Finally, it is to be understood that the above-described embodiments are intended to illustrate rather than limit the present disclosure. Variations may be made to the embodiments without departing from the spirit of the present disclosure as claimed. Elements associated with any of the above embodiments can be associated with any other embodiments. The above-described embodiments illustrate the scope of the present disclosure but do not restrict the scope of the present disclosure.

What is claimed is:

1. A method for making an electrode active material of a lithium ion battery comprising steps of:
    mixing elemental sulfur with a polyacrylonitrile to form a mixture;
    heating the mixture in vacuum or a protective gas at a heating temperature of about 250° C. to about 500° C., to form a sulfur containing composite; and
    reacting the sulfur containing composite with a reducing agent for elemental sulfur in a liquid phase medium to remove part of the elemental sulfur from the sulfur containing composite.

2. The method of claim 1, wherein the reducing agent is at least one of potassium borohydride and hydrazine.

3. The method of claim 1, wherein a mass ratio of the elemental sulfur and the polyacrylonitrile is in a range from about 1:2 to about 10:1.

4. The method of claim 1, wherein sulfur grafted poly(pyridinopyridine) is formed from the reacting of the sulfur containing composite with the reducing agent for elemental sulfur, and the sulfur grafted poly(pyridinopyridine) comprises a poly(pyridinopyridine) matrix and a plurality of polysulfur groups dispersed in the poly(pyridinopyridine) matrix.

5. The method of claim 4, wherein the reacting the sulfur containing composite with a reducing agent for elemental sulfur comprises steps of:
    introducing the sulfur containing composite into a container having the liquid phase medium filled therein;
    uniformly dispersing the sulfur containing composite in the liquid phase medium through mechanical stirring or ultrasonic vibration;
    adding the reducing agent into the container while continuously mechanically stirring or ultrasonically vibrating the liquid phase medium, to dissolve the reducing agent in the liquid phase medium and react the reducing agent with the sulfur containing composite; and
    separating the sulfur grafted poly(pyridinopyridine) from the liquid phase medium and purifying the sulfur grafted poly(pyridinopyridine).

6. The method of claim 5, wherein the liquid phase medium is heated at a temperature in a range from about 90° C. to about 150° C.

7. The method of claim 4, wherein the reacting the sulfur containing composite with a reducing agent for elemental sulfur comprises steps of:
    introducing the sulfur containing composite with the reducing agent into a container having the liquid phase medium filled therein;
    mechanically stirring or ultrasonically vibrating the liquid phase medium to uniformly disperse the sulfur containing composite in the liquid phase medium while dissolving the reducing agent in the liquid phase medium and reacting the reducing agent with the sulfur containing composite; and separating the sulfur grafted poly(pyridinopyridine) from the liquid phase medium and purifying the sulfur grafted poly(pyridinopyridine).

8. The method of claim 4, further comprising a step of electrochemically reducing the poly-sulfur groups into elemental sulfur.

9. The method of claim 8, wherein a reducing voltage for the electrochemically reducing is in a range from about 1.7 V to about 1.75 V.

10. The method of claim 4, wherein a weight percentage of a sulfur element in the sulfur grafted poly(pyridinopyridine) is equal to or less than 42%.

11. The method of claim 1, wherein the protective gas comprises at least one of an inert gas and a nitrogen gas.

12. The method of claim 1, wherein the heating the mixture is processed in a sealed container filled with the protective gas.

13. The method of claim 1, wherein the heating temperature is about 320° C. to about 400° C.

14. The method of claim 4, wherein each of the plurality of poly-sulfur groups consists of one or more sulfur elements, represented by a formula of $S_x$, and x is an integer between 1 and 8.

15. The method of claim 14, wherein the sulfur grafted poly(pyridinopyridine) comprises at least one chemical group of formulas:

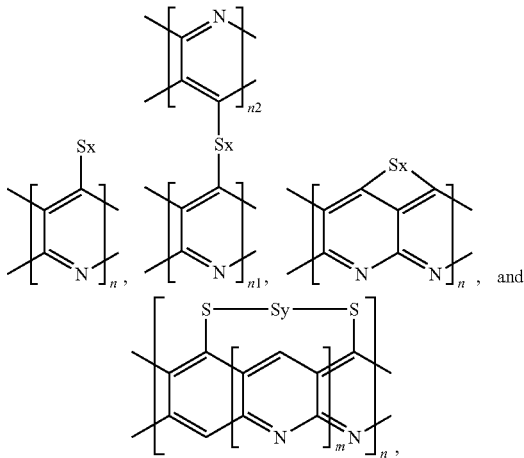

wherein n, n1, and n2 are an integer larger than 1, m and y are both an integer larger than 0.

* * * * *